May 27, 1930.  W. A. MORTON  1,760,371
APPARATUS FOR MELTING GLASS AND THE LIKE
Filed Nov. 19, 1926  2 Sheets-Sheet 1
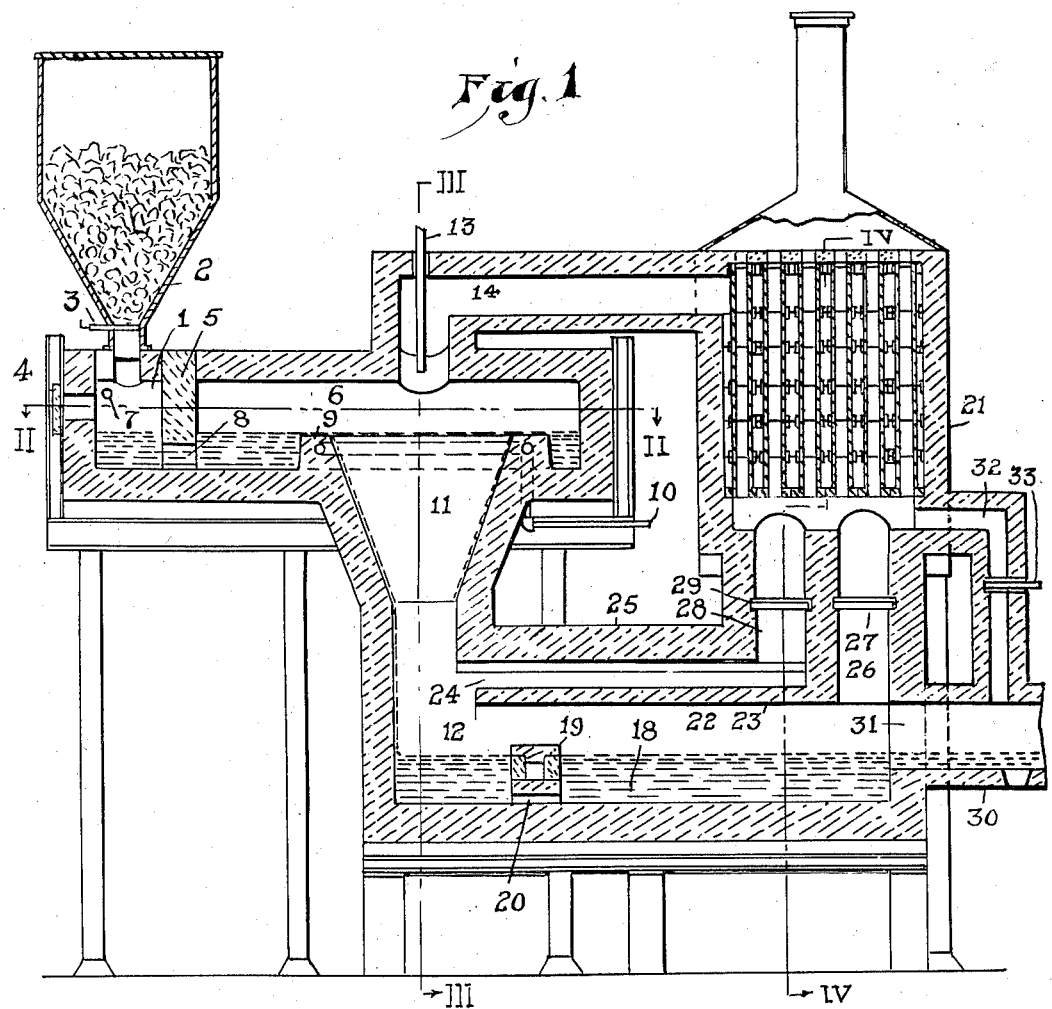
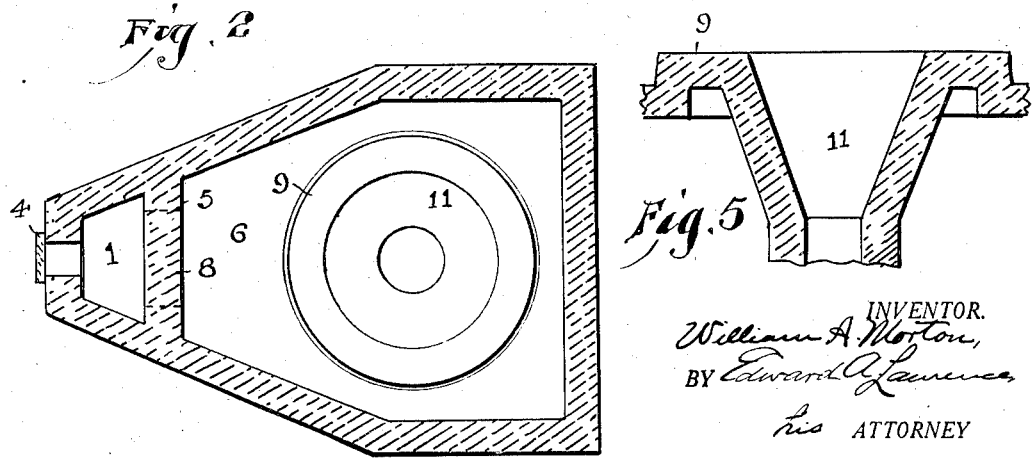
INVENTOR.
William A. Morton,
BY Edward A. Lawrence
his ATTORNEY May 27, 1930.  W. A. MORTON  1,760,371
APPARATUS FOR MELTING GLASS AND THE LIKE
Filed Nov. 19, 1926.  2 Sheets-Sheet 2
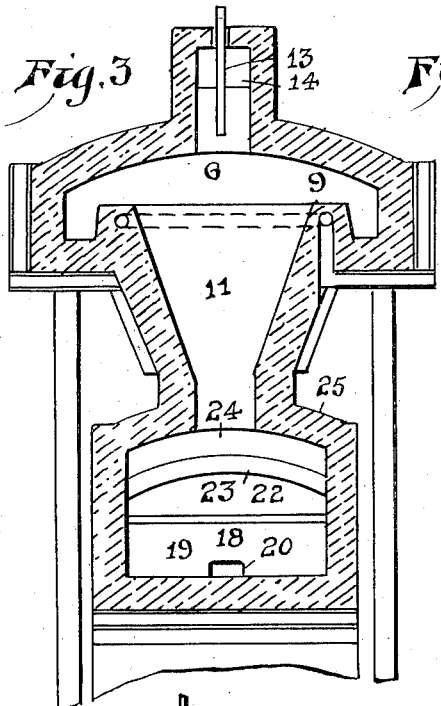
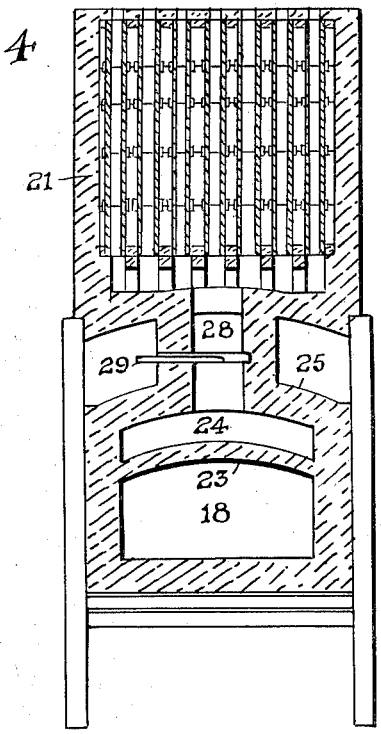
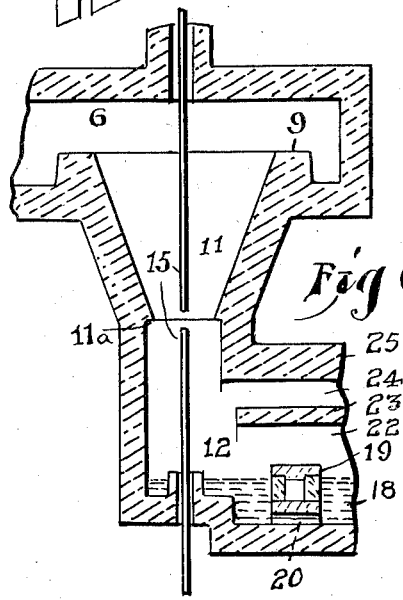
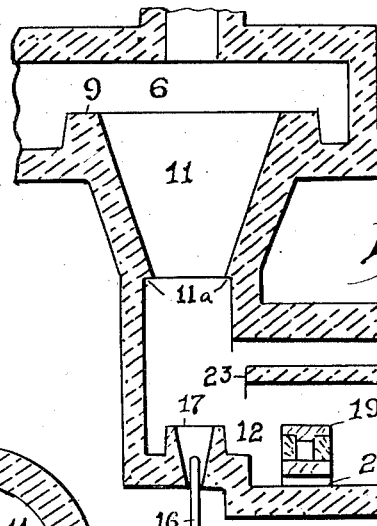
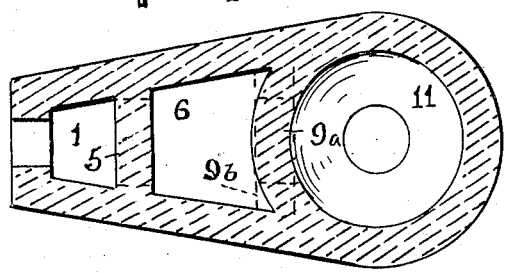
INVENTOR.
William A. Morton
BY Edward A. Lawrence
his ATTORNEY Patented May 27, 1930

1,760,371

UNITED STATES PATENT OFFICE

WILLIAM A. MORTON, OF PITTSBURGH, PENNSYLVANIA, ASSIGNOR, BY MESNE ASSIGNMENTS, TO AMCO INCORPORATED, OF PITTSBURGH, PENNSYLVANIA, A CORPORATION OF PENNSYLVANIA

APPARATUS FOR MELTING GLASS AND THE LIKE

Application filed November 19, 1926. Serial No. 149,312.

In the type of continuous glass furnaces now in general use, the raw materials, silica, soda ash, lime, &c. are charged at intervals into the furnace, usually into an extension of the main furnace, and become immediately submerged to a large extent in the body of the molten glass, thus preventing their exposure to the high temperatures requisite for proper melting and for effecting the necessary chemical reactions and combinations.

Again, as in the present practice, where the surface area of the body of molten and semi-molten materials, which is exposed to the direct action of this heat, is relatively small compared to the cubical contents of the body of the materials to be melted, due to the depth of the materials, and the unequal temperature conditions existing in the mass of the materials, convection currents are set in motion which tend to submerge a sufficient portion of the unreduced materials to minimize the effectiveness of the process of uniform reduction of the material.

Again, dust from the batches of materials charged into the furnace becomes mingled with the molten glass in the zone wherein the glass is supposed to be plained or relieved from gaseous bubbles which are developed during the fluxing processes; and thus, if the heat be sufficient, bubbles are redeveloped and the glass is presented for working in an improper condition.

The present type of furnaces are unprovided with positive or certain means for controlling the temperatures in the plaining or working zone, so that the danger of redeveloping bubbles therein, due to the boiling of the flux elements, is always present.

The larger percentage of glass analyses disclose the presence of sufficient raw materials not in solution to redevelop gas bubbles in the working zone if the heat there be sufficient.

The presence of bubbles in the glass when it is worked causes bubbles and scars in the product; and the failure to reduce all the raw materials to solution or to effect a proper and complete chemical combination of the materials results in unmarketable or inferior product.

In the present, accepted practice, the glass melting furnaces are generally of the regenerative type with a series of flames or burners extending over the metal, and the melting temperatures obtained are thus lacking uniformity.

Among the objects which I have in view are the following:

The provision of an improved continuous process of melting glass and preparing the same for working.

The charging of the raw materials in such manner that they do not become submerged in the body of the molten glass but are fully exposed to the melting and fluxing temperatures.

The prevention of dust from the materials entering the plaining and working zone or chamber of the furnace.

Accomplishing the steps of ebullition and of complete melting before the glass enters the plaining and working zone or chamber.

The plaining of the glass in the presence of temperatures sufficient to maintain it at proper fluidity but insufficient to cause a reboiling of any fluxing material present in the glass and not reduced to solution.

Thus I control the temperatures in the plaining and working zone or chamber so that in case the fusion or chemical reactions have not been completely accomplished a reboil of the flux elements in the plaining and working zone or chamber is preventable.

Again I have, in view of the subjection of all the materials passing through the furnace to the maximum temperatures, developed in the furnace for the purpose of effecting complete and uniform melting.

Other objects will appear from the following description.

With these and other purposes in view I employ the following operations of processes.

I introduce the materials into a receiving zone or chamber from which the dust in atmospheric suspension cannot escape to other portions of the furnace, and in which atmospheric disturbances are eliminated or minimized.

The materials are reduced in the receiving zone to a state of sufficient fluidity to pass into an ebullition zone, which preferably has no atmospheric connection with the receiving zone and wherein the materials are caused to ebullate to be thoroughly mixed to promote fusion preparatory to the reduction of viscosity to the state where the formed gases are readily released from the molten glass.

From the ebullition and mixing zone the molten material is caused to travel through what I term "a super-melting zone" in the form of a relatively thin sheet in the presence of the high temperatures requisite for the complete reduction of the materials. The travel of the glass in a relatively thin sheet through the super-melting zone is conveniently and preferably a gravity flow. A complete reduction of all the fluxing elements is accomplished during this stage and the glass is reduced to such state of fluidity that the gases formed by the chemical reactions are readily released.

The glass passes from the super-melting zone into a receiving zone or chamber and from the receiving zone or chamber the glass passes by means of a submerged outlet into the plaining and working zone or chamber.

I prefer to provide a receiving zone or chamber into which the glass passes from the super-melting zone and wherein the motion of the glass is retarded in its progress through the furnace before its admission to the plaining and working zone or chamber.

The temperatures of the plaining and working zone or chamber are so controlled that any flux materials not already reduced to complete solution will not boil and thus cause rebubbling in the glass which is being worked. This is accomplished by the control of the heat supply of the plaining and working chamber which receives its heat preferably from the supermelting zone.

I have invented a new and improved glass furnace structure, hereinafter described, whereby I am enabled to advantageously accomplish the ends in view.

In the accompanying drawings, wherein I have illustrated the best embodiment of the principles of my improved apparatus now known to me, Fig. 1 is a longitudinal vertical section of the glass melting furnace; Fig. 2 is a horizontal section taken along the line II—II in Fig. 1; Fig. 3 is a vertical section taken along the line III—III in Fig. 1; Fig. 4 is a vertical section taken along the line IV—IV in Fig. 1; Fig. 5 is a detail in vertical section showing a modified form of weir construction; Figs. 6 and 7 are sectional views similar to Fig. 3 but showing modifications in the heating means of the furnace, and Fig. 8 is a section similar to Fig. 2 but showing a modification.

Referring first to Figs. 1 to 4, inclusive, 1 represents the inclosed receiving chamber to the roof of which is connected the throat of the gravity feed bin 2 provided with a gate 3 by means of which the raw materials may be admitted in batches as needed to the chamber 1. The side of the chamber 1 is provided with a peep-hole which is normally closed by a lid 4.

The receiving chamber 1 is atmospherically isolated from the remainder of the furnace to eliminate atmospheric disturbances in the melting zones or chambers of the furnace, and it is heated either by the heat of conduction through the bridge wall 5 which separates it from the ebullition chamber 6, or by suitable means of its own which will not cause atmospheric disturbances therein. Thus opposed carbon electrodes, one of which is indicated at 7, may extend toward each other in the upper portion of the chamber 1, the same being connected with a suitable source of electric current, not shown.

The bridge wall 5 is provided with a submerged outlet 8 which connects the receiving chamber 1 with the ebullition chamber 6 below the top level of the molten material in said chambers, thus permitting the molten mass to feed through from the receiving chamber to the ebullition chamber, but preventing the entrance of dust thereto.

The temperatures in the receiving chamber are sufficient to melt and reduce the raw materials to a condition sufficiently fluidic to cause them to flow through the outlet 8 into the chamber 6.

The temperature of the chamber 6 is sufficient to cause the boiling and mixing of the flux and other raw materials and initiate the necessary chemical reactions and combinations.

The chamber 6 is provided with a weir or dam 9 over which the molten glass flows in the form of a relatively thin sheet in which form it is subjected to the highest temperatures of the furnace to complete the melting and fusion of the materials.

In the preferred form of my apparatus, the weir 9 is of circular form, the ebullition chamber 6 surrounding the same.

The weir may be cooled as by the circulation of air or water through the pipe 10 embedded in the refractory material of the weir, as shown in Fig. 1, to prolong its life, or it may be of the cross-sectional form shown in Fig. 5 to increase its surface effective for the escape of heat by radiation for the same purpose.

In Fig. 8 I have shown in solid lines the weir 9$^a$ of arcuate form intersecting the chamber 6 from side to side, and in dotted lines in Fig. 8 I have shown a straight weir 9$^b$ disposed transversely of the chamber 6.

However, I prefer the circular type of weir because its plane surface parallels the lines of heat from the burner and adds greater mechanical resistance to the pressure of the glass, thus eliminating the necessity of assuming complicated stresses or the dependence on refractories in flexure.

The glass overflowing, the weir 9 travels in a relatively thin sheet through a superheating zone or passage 11, the same being preferably arranged on a substantially vertical axis, so as to obtain a gravity flow.

If the weir be of circular shape, the flow will be in the form of a more or less complete cylinder, while the arcuate form of weir will produce a flow of arcuate cross-sectional shape and the straight form of weir produces a flow of flat cross-sectional shape.

Where the weir is of circular form as shown on Fig. 1, the vertical passage 11, in which the glass travels downwardly after passing over the weir, is preferably provided with an upper portion of upwardly increasing diameter, as shown in Fig. 1, and the flow of glass will travel down along the inclined wall of the upper passage and then down the lower passage, and be deposited and accumulated in the receiving chamber 12.

It is to be noted that the furnace may have a relatively small horizontal cross-sectional width by the use of an arcuate weir, preferably a circular weir. Thus the surface area of the glass flowing in sheet form through the passage 11 is greatly increased, thus magnifying the heat transmission and thus facilitating the completion of the chemical combination of the materials which go to form the glass.

In Figs. 6 and 7 the lower end of the outwardly flaring upper portion of the passage 11 is a smaller channel than the lower cylindrical portion of the passage, forming a shoulder 11ª, so that the upper sheet of molten glass traveling down the lower passage is out of contact with the walls of said lower passage, thereby exposing both sides of the glass to the heating effect, and thus producing a complete reduction of the materials and eliminating the bubbles.

The relatively high temperatures required for the supermelting of the glass as it flows along and through the flow passage 11 may be obtained in a number of ways.

Thus in Figs. 1 and 3 I show a gas burner 13 extending down through the roof of the chamber 6 in axial alinement with the passage 11, the discharge end of the preheated air conduit 14 leading from the recuperator, to be referred to later, surrounding the burner in the usual manner.

In Fig. 6 I show the two opposed carbon electrodes 15 extending axially of the passage, and in Fig. 7 I show the gas burner 16 extending up through the bottom of the chamber 12 and surrounded by the circular wall 17 to the bore of which the preheated air is admitted from the recuperator.

It is evident that the glass which is spread in the form of a relatively thin sheet or film in the passage 11 is thus subjected to the full heating effect of the heating means employed. I prefer to use the gas flames, passing them in parallel planes to the path of the glass in passage 11 and preferably in the same direction, as indicated in Figs. 1 and 3. This provides an intimate and continuous subjection of the glass flow to the heating flames, thereby facilitating and completing the melting and fluxing operations, and the highest temperatures are presented where required while the lesser temperatures resulting from heat transmission are passed in regulable quantities to control the glass working heats.

The chamber 12 in which the gravity flow of the glass is received and in which the glass accumulates is separated from the working chamber 18 by the bridge wall 19 having a submerged connecting opening 20 below the glass level.

The velocity of the traveling glass is checked in the chamber 12 and the supply of glass in the chamber 18 is maintained without disturbance.

The function of the supermelting passage or zone is a novel one. The purpose is to eliminate or complete the elimination of the gases resulting from the chemical reactions and combinations in the molten mass of the materials which form the product in view. Thus I am enabled to deliver the glass to the working zone free of encluded gases which might impair the quality of the product.

I accomplish this purpose by so reducing the viscosity of the molten materials that the gases formed by the action of the fluxes more readily escape. Thus the viscosity is preferably reduced much below that of glass which in the present processes is considered as in workable condition.

The subjection of the glass in the form of a relatively thin sheet to the supermelting temperatures also reduces the glass to a uniform viscosity before it enters the working chamber.

Again, by causing the glass to travel through the supermelting zone in the form of a relatively thin sheet substantially the entire body of the glass is uncovered to the action of the flame temperatures, thereby presenting substantially all of the elements to the action of the supermelting heat.

In the present practice only the surface area of a relatively deep body of glass is subject to the flame temperatures, the mass of the glass being subjected only to the heat of conduction which is relatively lower than the flame heat.

The result is that in the present practice the glass is delivered to the working zone of the furnace in a relatively deep mass of varying viscosity and an ununiform and unstable chemical composition.

In my invention the glass is delivered into the working zone in a uniform state of viscosity and in a uniform and stable state of chemical formation. This is largely due to the fact that substantially the entire mass of the glass is uncovered to flame temperatures and its viscosity is uniformly reduced, assuring free molecular activity of the combining raw materials.

At the lower end of the flow passage 11 two separate flues connect with the recuperator 21. The lower flue 22 is formed by the upper portion of the chambers 12 and 18 and is roofed by the arch 23, while the upper flue 24 is between the arch 23 and the roof arch 25 of the furnace. The flue 22 is connected by the passage 26, provided with a valve 27, with the recuperator 21, while the flue 24 is connected with the recuperator by means of a passage 28 having a valve 29.

By means of the separate flues with their individual valves, the temperature of the plaining and working chamber 18 may be controlled so as to maintain the glass in proper working condition and to prevent any of the fluxing materials not in solution which may be present in the glass in the working chamber from reboiling and thus forming bubbles in the working supply of the glass.

A unique feature is the employment of the waste heat from the supermelting zone to heat the plaining and working chamber, thus obtaining the necessary temperatures which are lower than that required in the super-melting zones, and regulating the temperature gradient through the working zone to maintain the proper working temperature by means of what would otherwise be wasted heat.

I have not described the recuperator structure in detail, as the construction of the same per se is not a part of my present invention. The recuperator which I have illustrated in the accompanying drawings is that shown and described in Letters Patent of the United States No. 1,587,171, issued to me on June 1, 1926. It is sufficient for the present disclosure to say that the duct or passage 14 is connected to the preheated air outlet of the recuperator while the waste gas passages 26 and 28 are connected to the waste gas passages of the recuperator.

The working chamber 18 may be provided with means for withdrawing the glass directly therefrom for the fabricating operations, or it may be provided with a connecting withdrawal chamber or chambers, such for instance as the shallow extension, or feeder boot 30, shown in Fig. 1, which obtains a constant level supply of glass from the chamber 18 through the port or passage 31.

The boot is preferably roofed over and its upper portion connected to the waste gases passages of the recuperator 21 by means of a duct 32 provided with a damper or regulating valve 33. Thus the heat currents from the chamber 18 may be caused to flow through the boot 30 in contact with its molten glass contents to the extent necessary to maintain the glass at proper temperature for working.

In such case I make a substantial economy in heating cost by taking the waste heat from the melting furnace and employing it to heat and regulate temperature of the metal in the extension or extensions of the working chamber, and then directing the heat to the recuperator for the purpose of preheating the combustion air for furnace purposes.

In my process and by the use of my improved melting furnace, the materials may be introduced continuously or in relatively small quantities and at frequent intervals, the ebullition and mixing chamber being preferably relatively shallow to prevent a mass of molten material of substantial depth. Thus the operation of ebullition may be more thoroughly and more rapidly accomplished and in the presence of lower temperature than would be possible were the chamber to contain a greater depth of materials which are to be ebullated.

By employing a recuperator for preheating the air for the gas burner or burners I obtain a continuous supply of preheated air uniform in volume and temperature, and thus am enabled to maintain a uniformity of furnace temperatures constantly entrained in the proper melting area and impossible with a glass melting furnace of the regenerative type.

It will be observed that my furnace comprises two general divisions or sections, one within which the melting and fluxing operations are effected and the other in which the glass is presented for working.

In the preferred construction illustrated in the drawings, the materials are reduced and ebullated at the higher level and then while flowing by gravity in a relatively thin sheet or film is subjected to the highest furnace temperatures so that the gases are eliminated and the reduction of the materials and the chemical reactions and combinations are thoroughly and completely effected.

By applying the heating means primarily to the glass as it travels in the form of a relatively thin sheet, I apply the highest temperatures in the zone wherein they are most effective, and am enabled to first reduce the raw materials to fluidic condition sufficient to cause the fluid mass to enter the ebullition chamber wherein higher temperatures are required and present, and this first step is accomplished without injurious atmospheric disturbance and without danger of the materials entering the finishing zones in dust form.

Also by applying the highest temperatures to the zone through which the glass is traveling in sheet form, I avoid the presence of temperatures in the plaining and working chamber sufficient to cause a reboiling and rebubbling of the glass presented for working.

By means of my arrangement of a plurality of waste gas flues connected with the recuperator, I am able to control the temperatures in the plaining and working zone, thereby maintaining the glass at the proper viscosity and condition.

Since within recognized limits a variation of the condition of the glass as to fluidity and viscosity is requisite in accordance with the character of the product to be produced, this control of the temperatures of the glass in the working zone or chamber of the furnace is highly important. In the present practice the highest temperatures are present in a single combustion zone and the temperatures of the glass presented for working are not sufficiently controlled.

In my process while the furnace is being worked the overflow or discharge of the glass from the ebullition chamber is maintained at a uniform rate, so that there is a continuous sheet of glass passing through the supermelting zone and supplied to the working chamber without involving the maintenance of relatively deep masses of molten glass in a static condition.

What I desire to claim is:—

1. A glass melting furnace including a high level melting chamber having an overflow weir, a gravity flow passage defined by an inclosing wall inclined to the horizontal and receiving the overflow from the chamber and over the wall of which the glass flows in a thin continuously moving sheet, a working chamber which the glass enters after traversing said passage, direct means for heating said passage with supermelting temperatures, and means for heating said chambers by the indirect heat from said passage.

2. A glass melting furnace including a high level melting chamber having an overflow weir, a gravity flow passage defined by an inclosing wall inclined to the horizontal and receiving the overflow from the chamber and over the wall of which the glass flows in a thin continuously moving sheet, a low level working chamber which the glass enters after traversing said passage, direct means for heating said passage with supermelting temperatures, the working chamber being heated from the passage, and means for regulating the transference of heat currents to the working chamber.

3. In a glass melting furnace, the combination of a supermelting passage, a working chamber, a gaseous fuel burner for the supermelting passage, a recuperator supplying preheated air to the burner, and selective means whereby the heat currents from the supermelting passage may be led through the working chamber to the recuperator or directly to the recuperator.

4. In a glass melting furnace, the combination of an ebullition chamber, a weir surrounded by the body of molten glass in said chamber, a vertical flow passage into which the glass overflows from said chamber, and means for applying the highest furnace temperatures to the glass in said passage.

5. In a glass melting furnace, the combination of an ebullition chamber, a vertical flow passage, a circular weir forming the upper end of the flow passage and surrounded by said chamber, and means for applying the highest furnace temperature to the glass in said passage.

6. In a glass melting furnace, the combination of a supermelting passage, a working chamber, a gaseous fuel burner for the supermelting passage, a recuperator supplying preheated air to the burner, and selective means whereby all the heat currents from the supermelting passage may be led through the working chamber in direct contact with the glass or a portion diverted through an adjacent passage within the walls of the furnace to control the viscosity of the glass by indirect heating.

7. In a glass melting tank, the combination of an ebullition chamber, a gravity flow passage through which the glass passes from said chamber, means for the application of supermelting temperatures to the glass traversing said passage, and means whereby the glass is prevented from contact with the wall of said passage for a portion of the latter whereby both surfaces of the flow of glass are subjected to the supermelting temperatures.

8. In apparatus for melting glass, the combination of a plurality of chambers which are atmospherically isolated, one of said chambers being a reducing chamber into which the materials are introduced and another of said chambers being an ebullition chamber, said chambers having a submerged connection between them, a circular weir in the ebullition chamber, said weir being surrounded by the molten glass in said ebullition chamber, a vertical passage into which the glass overflows the weir and travels therethrough in the form of an extended sheet, and direct heating means for said passage.

9. In apparatus for melting glass, the combination of a plurality of chambers which are atmospherically isolated, one of said chambers being a reducing chamber into which the materials are introduced and another of said chambers being an ebullition chamber, said chambers having a submerged connection between them, a circular weir in the ebullition chamber, said weir being surrounded by the molten glass in said ebullition chamber, a vertical passage into which the glass overflows the weir and travels therethrough in the form of an extended sheet, a working chamber into which the glass travels from said passage, means for applying supermelting temperatures to the glass in said passage, and means for heating the working chamber by waste heat from said passage.

10. In apparatus for melting glass, the combination of a plurality of chambers which are atmospherically isolated, one of said chambers being a reducing chamber into which the materials are introduced and another of said chambers being an ebullition chamber, said chambers having a submerged connection between them, a circular weir in the ebullition chamber, said weir being surrounded by the molten glass in said ebullition chamber, a vertical passage into which the glass overflows the weir and travels therethrough in the form of an extended sheet, a working chamber into which the glass travels from said passage, means for applying supermelting temperatures to the glass in said passage, and means for heating the ebullition chamber and the working chamber by waste heat from said passage.

11. In apparatus for melting glass, the combination of a passage through which the glass travels and wherein it is subject to the highest furnace temperatures, a working chamber into which the glass is delivered from said passage, a feeder boot to which the glass is supplied from the working chamber, a recuperator, and means for leading the heat currents from said passage into said working chamber and feeder boot on its way to the recuperator.

12. In apparatus for melting glass, the combination of a passage through which the glass travels and wherein it is subject to the highest furnace temperatures, a working chamber into which the glass is delivered from said passage, a feeder boot to which the glass is supplied from the working chamber, a recuperator, and selective means for leading the heat currents from said passage into said working chamber and feeder boot on its way to the recuperator.

13. In a glass melting tank, the combination of a melting chamber, an ebullition chamber connected to the melting chamber by a submerged opening, a weir which the glass overflows from the ebullition chamber, a glass-supporting surface over which the overflowing glass travels by gravity in the form of a thin and widely distributed sheet, means for applying supermelting temperatures to the sheet of glass traveling over the supporting surface, and a chamber which receives the glass from the supporting surface.

14. In a glass melting tank, the combination of a melting chamber, an ebullition chamber connected to the melting chamber by a submerged opening, a weir which the glass overflows from the ebullition chamber, a glass-supporting surface over which the overflowing glass travels by gravity in the form of a thin and widely distributed sheet, means for applying supermelting temperatures to the sheet of glass traveling over the supporting surface, a chamber which receives the glass from the supporting surface, and a working chamber connected to the receiving chamber by a submerged opening.

15. In a glass melting tank, the combination of a melting chamber, an ebullition chamber connected with the melting chamber by a submerged opening, a continuous weir surrounded by the ebullition chamber and which the glass overflows from the ebullition chamber, a glass supporting surface over which the overflowing glass travels by gravity in the form of a thin and widely extended sheet, means for applying supermelting heat to the sheet of glass traveling over the supporting surface, and a chamber which receives the glass from said surface.

16. In a glass melting tank, the combination of a melting chamber, an ebullition chamber connected with the melting chamber by a submerged opening, a continuous weir surrounded by the ebullition chamber and which the glass overflows from the ebullition chamber, a glass supporting surface over which the overflowing glass travels by gravity in the form of a thin and widely extended sheet, means for applying supermelting heat to the sheet of glass traveling over the supporting surface, a chamber which receives the glass from said surface, and a working chamber connected to the receiving chamber by a submerged opening.

17. In a glass melting tank, the combination of a melting chamber, an ebullition chamber connected to the melting chamber by a submerged opening, a weir which the glass overflows from the ebullition chamber, a glass supporting surface over which the overflowing glass travels by gravity in the form of a thin and widely extended sheet, means for applying supermelting temperatures to the sheet of glass traveling over the supporting surface, a chamber receiving the glass from the supporting surface, and means for heating the glass in the ebullition chamber by the indirect heat from the supporting surface.

18. In a glass melting tank, the combination of a melting chamber, an ebullition chamber connected to the melting chamber by a submerged opening, a weir which the glass overflows from the ebullition chamber, a glass supporting surface over which the overflowing glass travels by gravity in the form of a thin and widely extended sheet, means for applying supermelting temperatures to the sheet of glass traveling over the supporting surface, a chamber receiving the glass from the supporting surface, and means for heating the glass in the receiving chamber by the waste heat from the supporting surface.

19. In a glass melting tank, the combination of a melting chamber, an ebullition chamber connected to the melting chamber by a submerged opening, a weir which the glass overflows from the ebullition chamber, a glass supporting surface over which the overflowing glass travels by gravity in the form of a thin and widely extended sheet, means for applying supermelting temperatures to the sheet of glass traveling over the supporting surface, a chamber receiving the glass from the supporting surface, and means for heating the glass in the ebullition chamber and in the receiving chamber by the indirect heat from the supporting chamber.

Signed at Pittsburgh, Pa., this 17th day of Nov., 1926.

WILLIAM A. MORTON.